(12) United States Patent
Jeon et al.

(10) Patent No.: US 8,032,374 B2
(45) Date of Patent: Oct. 4, 2011

(54) METHOD AND APPARATUS FOR RECOGNIZING CONTINUOUS SPEECH USING SEARCH SPACE RESTRICTION BASED ON PHONEME RECOGNITION

(75) Inventors: Hyung Bae Jeon, Daejeon (KR); Jun Park, Daejeon (KR); Seung Hi Kim, Daejeon (KR); Kyu Woong Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 915 days.

(21) Appl. No.: 11/950,130

(22) Filed: Dec. 4, 2007

(65) Prior Publication Data
US 2008/0133239 A1 Jun. 5, 2008

(30) Foreign Application Priority Data

Dec. 5, 2006 (KR) .................. 10-2006-0122576
Jul. 13, 2007 (KR) .................. 10-2007-0070733

(51) Int. Cl.
*G10L 15/04* (2006.01)
(52) U.S. Cl. ................................. 704/254
(58) Field of Classification Search .......... 704/254
See application file for complete search history.

(56) References Cited

U.S. PATENT DOCUMENTS

| 6,374,219 B1 * | 4/2002 | Jiang ............................ 704/255 |
| 2001/0037200 A1 * | 11/2001 | Ogawa et al. ................. 704/246 |
| 2002/0165715 A1 | 11/2002 | Riis et al. |
| 2003/0204396 A1 * | 10/2003 | Wakita et al. ................. 704/231 |
| 2003/0204399 A1 * | 10/2003 | Wolf et al. .................... 704/251 |
| 2004/0111266 A1 * | 6/2004 | Coorman et al. ............. 704/260 |
| 2007/0038453 A1 * | 2/2007 | Yamamoto et al. ........... 704/257 |
| 2008/0059188 A1 * | 3/2008 | Konopka et al. ............. 704/257 |

FOREIGN PATENT DOCUMENTS

| JP | 10-003296 | 1/1998 |
| JP | 2000-089791 | 3/2000 |
| JP | 2001-242886 | 9/2001 |
| JP | 2003-005787 A | 1/2003 |
| KR | 1997-0050114 | 7/1997 |
| KR | 1020030010979 | 2/2003 |
| KR | 1020040072104 A | 8/2004 |
| KR | 1020040076035 A | 8/2004 |
| WO | 2005/077098 A2 | 8/2005 |

* cited by examiner

*Primary Examiner* — Jakieda Jackson
(74) *Attorney, Agent, or Firm* — Ladas & Parry LLP

(57) ABSTRACT

Provided are an apparatus and method for recognizing continuous speech using search space restriction based on phoneme recognition. In the apparatus and method, a search space can be primarily reduced by restricting connection words to be shifted at a boundary between words based on the phoneme recognition result. In addition, the search space can be secondarily reduced by rapidly calculating a degree of similarity between the connection word to be shifted and the phoneme recognition result using a phoneme code and shifting the corresponding phonemes to only connection words having degrees of similarity equal to or higher than a predetermined reference value. Therefore, the speed and performance of the speech recognition process can be improved in various speech recognition services.

15 Claims, 4 Drawing Sheets

FIG. 3

Set of phonemes

P: aa ae ah ao aw ax axr ay b bd ch d dd dh dx eh er ey f g gd hh ih ix iy jh k kd l m n ng ...

Phoneme codes

206': 0 1 0 0 0 0 1 0 0 0 1 0 0 0 0 0 0 0 0 0 0 0 1 0 0 0 0 0 0 0 0 0 1 0 ...
207': 1 0 0 0 0 1 0 0 0 0 0 0 0 0 0 0 0 0 0 0 0 0 0 0 0 0 1 0 0 0 0 1 0 0 0 0 0 0 ...
208': 0 1 0 0 0 0 1 0 0 0 0 0 0 0 0 0 0 0 0 0 0 0 0 0 1 0 0 0 1 0 0 0 1 0 ...
209': 0 1 0 0 0 1 0 0 0 0 0 0 0 0 0 0 0 0 0 0 0 0 0 0 0 0 1 0 0 0 0 1 0 0 0 ...

Pronouncing dictionary

206  San Diego    s ae n d ay eh g ow
207  Chicago      sh ax k aa g ow
208  San Francisco  s ae n f r ae n s ih s k ow
209  Seattle      s iy ae dx ax l

US 8,032,374 B2

METHOD AND APPARATUS FOR RECOGNIZING CONTINUOUS SPEECH USING SEARCH SPACE RESTRICTION BASED ON PHONEME RECOGNITION

CROSS-REFERENCE TO RELATED APPLICATION

This application claims priority to and the benefit of Korean Patent Application No. 2006-122576, filed Dec. 5, 2006, and No. 2007-70733, filed Jul. 13, 2007, the disclosure of which is incorporated herein by reference in its entirety.

BACKGROUND

1. Field of the Invention

The present invention relates to a method and apparatus for recognizing continuous speech using search space restriction based on phoneme recognition and, more specifically, to a technique for recognizing continuous speech in which a search space is reduced by restricting connection words to be transitioned at a boundary between words based on a phoneme recognition result in order to improve the speed and performance of speech recognition.

2. Discussion of Related Art

In general, a continuous speech recognition system employs a word network in order to restrict a search space, and the word network is principally embodied by a finite state network (FSN), word-pair grammar, or N-gram. A general idea of the word network is to connect words subsequent to a word by fixing the subsequent words according to rules or connecting statistically probable values.

According to the word-pair grammar, only words that can be subsequent to a specific word are connected. The word-pair grammar is a technique of searching words on the principle that, for example, words "want" and "to eat" can be connected in this order, but they cannot be connected in reverse order. However, according to the word-pair grammar, when a user speaks without using previously defined, standard grammar rules, it is impossible to search words.

The N-gram makes use of statistical probability to connect words. Specifically, the probability of a certain word being subsequent to another word is calculated using a bundle of learning data so that a search process is performed on highly probable words. However, practical use of the N-gram necessarily requires a large number of word bundles, and the N-gram is inadequate for dialogic speech recognition.

According to the FSN, all sentences that can be composed are bundled as a network. Although the FSN can speed up a recognition process, when the number of sentence patterns to be recognized increases, the size of a search space expressed by the FSN also increases, so that a search time increases and speech recognition performance deteriorates.

SUMMARY OF THE INVENTION

The present invention is directed to a method and apparatus for recognizing continuous speech using search space restriction based on phoneme recognition. According to the method and apparatus of the present invention, a continuous speech recognition process is divided into a primary speech recognition step and a secondary speech recognition step. Thus, in the primary speech recognition step, phoneme recognition is performed. In the secondary speech recognition step, a search space is reduced by restricting connection words to be transitioned at a boundary between words based on a phoneme recognition result to perform speech recognition so that the speed and performance of the speech recognition can be improved.

One aspect of the present invention is to provide an apparatus for recognizing continuous speech using search space restriction based on phoneme recognition. The apparatus includes: a speech feature extraction unit for extracting a feature vector from an input speech signal; a phoneme recognition unit for recognizing phonemes based on the feature vector of the speech signal; and a phoneme-based speech recognition unit for constructing a connection word search network having a restricted search space based on the phoneme recognition result to perform a speech recognition process based on the connection word search network.

Another aspect of the present invention is to provide a method of recognizing continuous speech using search space restriction based on phoneme recognition. The method includes the steps of: (a) extracting a feature vector from an input speech signal; (b) recognizing phonemes based on the extracted feature vector; and (c) constructing a connection word search network having a restricted search space based on the phoneme recognition result, and performing a speech recognition process based on the connection word search network.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 3 is a diagram for explaining a phoneme code used for the method and apparatus according to the present invention.

DETAILED DESCRIPTION OF EMBODIMENTS

The present invention will be described more fully hereinafter with reference to the accompanying drawings, in which exemplary embodiments of the invention are shown.

Figure 1:
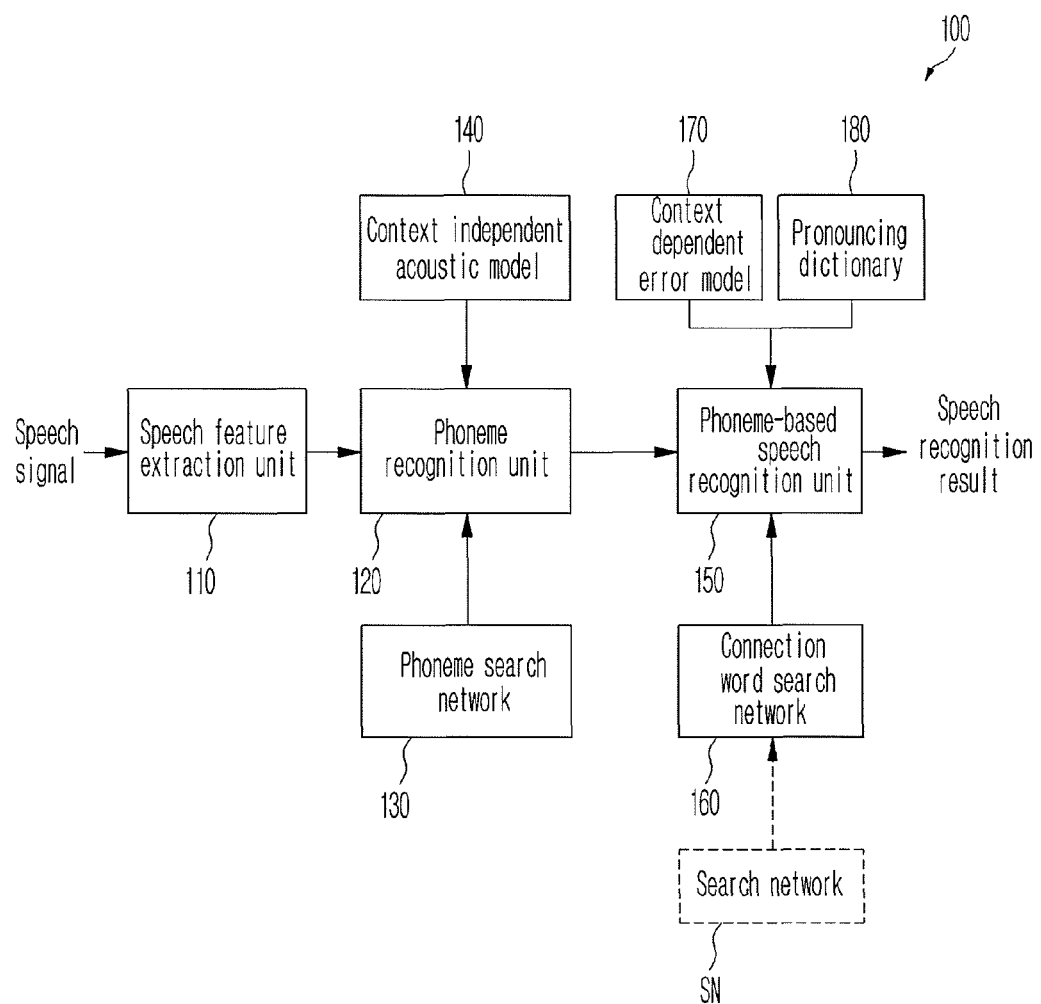
FIG. 1 is a block diagram of a continuous speech recognition apparatus using search space restriction based on phoneme recognition according to an exemplary embodiment of the present invention.

FIG. 1 is a block diagram of a continuous speech recognition apparatus using search space restriction based on phoneme recognition according to an exemplary embodiment of the present invention.

Referring to FIG. 1, a continuous speech recognition apparatus 100 according to the present invention includes a speech feature extraction unit 110, a phoneme recognition unit 120, a phoneme search network 130, a context independent acoustic model 140, a phoneme-based speech recognition unit 150, a connection word search network 160, a context dependent error model 170, and a pronouncing dictionary 180.

The speech feature extraction unit 110 extracts a feature vector from an input speech signal and transmits the feature vector to the phoneme recognition unit 120.

The phoneme recognition unit 120 recognizes phonemes based on the feature vector extracted by the speech feature extraction unit 110 and outputs the recognized phonemes. In this case, the phoneme search network 130, which includes phoneme n-gram, and the context independent acoustic model 140 are used to recognize the phonemes.

The phoneme-based speech recognition unit 150 constructs the connection word search network 160 having a restricted search space from a search network based on the phoneme recognition result and performs a speech recognition process based on the connection word search network 160. The speech recognition process will be described in more detail with reference to FIG. 2.

Figure 2:
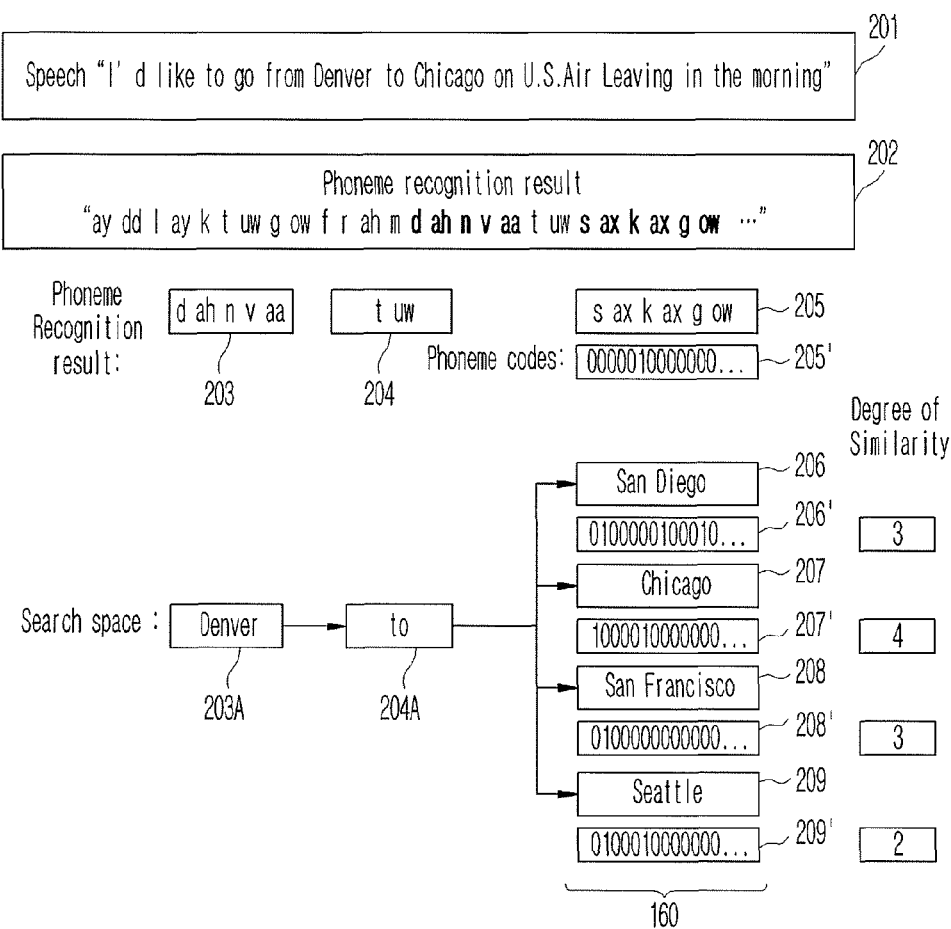
FIG. 2 is a diagram for explaining a method of restricting a search space based on phoneme recognition.

FIG. 2 is a diagram for explaining a method of restricting a search space based on phoneme recognition.

Referring to FIG. 2, for example, when a spoken sentence "I'd like to go from Denver to Chicago on U.S.AIR leaving in the morning." is input in step 201, the phoneme recognition unit 120 performs a phoneme recognition process and outputs "ay dd l ay k t uw g ow f r ah m d ah n v aa t uw s ax k ax g ow aa n y uw eh s ae r l iy v ix ng ih n dh ax m ao r n ix ng" as a phoneme recognition result in step 202. Although correct phoneme sequence of Denver is "d en n v axr", our phoneme recognition output could have several recognition errors.

Next, the phoneme-based speech recognition unit 150 receives each phoneme of the phoneme recognition result and recognizes a word corresponding to the received phoneme using the context dependent error model 170 and the pronouncing dictionary 180. For example, "d ah n v aa t" 203 is recognized as "Denver (d eh n v axr)" 203A, and "t uw" 204 is recognized as "to (t uw)" 204A.

In this case, the phoneme-based speech recognition unit 150 may recognize a word defined in the search network if possible.

After that, the phoneme-based speech recognition unit 150 constructs the connection word search network 160 having a restricted search space based on the recognized word. For instance, since there is a strong probability that a word subsequent to "Denver" 203A and "to" 204A will be a place name, the connection word search network 160 is constructed with place names such as "San Diego" 206, "Chicago" 207, "San Francisco" 208, and "Seattle" 209.

As described above, connection words are restricted based on the phoneme recognition result at a boundary between words where the words will be shifted, thereby reducing a search space. As a result, the speed and performance of speech recognition can be enhanced.

Subsequently, the phoneme-based speech recognition unit 150 converts N phoneme sequences, for example, "s ax k ax g ow" 205, which are subsequent to the presently recognized phoneme sequences, into a phoneme code, for example, "0000010000000 . . . " 205'. The phoneme code will be described in more detail with reference to FIG. 3.

FIG. 3 is a diagram for explaining a phoneme code used for the method and apparatus according to the present invention.

Referring to FIG. 3, a set of phonemes to be recognized, that is, "aa ae ah ao aw ax axr ay b bd ch d dd . . . " (referred to as "P"), are arranged in appropriate order. Thus, when a specific word includes a phoneme taken in the corresponding order, the corresponding code value is set as "1", and when the word does not include the phoneme, the corresponding code value is set as "0". In this case, when the word includes a phoneme that may be phonetically changed due to multiple pronunciations, the corresponding code value is set as "1". For example, assuming that "Seattle (s iy ae dx ax l)" 209 may be pronounced as "s iy ae t ax l", each code corresponding to phonemes "t" other than phonemes "s", "iy", "dx", "ax", "l" included in the word "Seattle" 209 is set as "1", so that "Seattle" 209 can be converted into a phoneme code "0100010000000 . . . " 209'.

Meanwhile, phoneme codes of all words given in the pronouncing dictionary 180 may be predefined according to the above-described definition of the phoneme code, and stored along with pronunciation sequences of the corresponding words.

Referring again to FIG. 2, the phoneme-based speech recognition unit 150 calculates degrees of similarity between the phoneme code 205' of the phonemes "s ax k ax g ow" 205 and phoneme codes 206', 207', 208', and 209' of connection words 206, 207, 208, and 209 to be shifted to the connection word search network 160.

More specifically, a logic AND operation is performed on the phoneme code "0000010000000 . . . " 205' of the phonemes "s ax k ax g ow" 205 and the phoneme code 206' of the connection word "San Diego" 206 to be shifted, thereby obtaining a result "0000010000000 . . . ". The sum of respective code values of the result "0000010000000 . . . " is equal to "3". The value "3" means the number of phonemes shared between the two phoneme codes. As the obtained value is higher, it can be decided that the two phoneme codes are more similar. Therefore, the obtained value can be used to calculate the degree of similarity.

In the same manner as above, a logic AND operation is performed on the phoneme code "0000010000000 . . . " 205' of the phonemes "s ax k ax g ow" 205 and the phoneme code 207' of the connection word "Chicago" 207 to obtain a degree of similarity of "3", a logic AND operation is performed on the phoneme code "0000010000000 . . . " 205' of the phonemes "s ax k ax g ow" 205 and the phoneme code 208' of the connection word "San Francisco" 208 to obtain a degree of similarity of "3", and a logic AND operation is performed on the phoneme code 209' of the connection word "Seattle" 209 to obtain a degree of similarity of "2".

Thereafter, the phoneme-based speech recognition unit 150 deletes the connection words (e.g., "Seattle" 209 having a degree of similarity lower than a predetermined reference value (e.g., "2") from a search path not to shift the phonemes "s ax k ax g ow" 205 to the deleted connection words.

In the present invention, the reference value may be variously changed by one of ordinary skill.

Next, the phoneme-based speech recognition unit 150 shifts the phonemes "s ax k ax g ow" 205 to the connection words (e.g., "San Diego" 206, "Chicago" 207, "San Francisco" 208) having a degree of similarity equal to or higher than the predetermined reference value (e.g., "2") and performs a speech recognition process on the shifted words. In this case, speech recognition errors, such as insertion errors, deletion errors, and transposition errors, may be corrected using the context dependent error model 170 based on a discrete HMM model (DHMM) as a acoustic model.

As described above, the continuous speech recognition apparatus 100 according to the present invention can primarily reduce the search space by restricting connection words to be shifted at the boundary between words based on the phoneme recognition result. In addition, the continuous speech recognition apparatus 100 can secondarily reduce the search space by rapidly calculating the degree of similarity between the connection word to be shifted and the phoneme recognition result using the phoneme code and shifting the corresponding phonemes to only connection words having degrees of similarity equal to or higher than a predetermined reference value. Therefore, according to the present invention, it can be expected that the speed and performance of the speech recognition process will be improved.

Hereinafter, a method of recognizing continuous speech recognition using search space restriction based on phoneme recognition according to the present invention will be described in detail with reference to FIG. 4.

Figure 4:
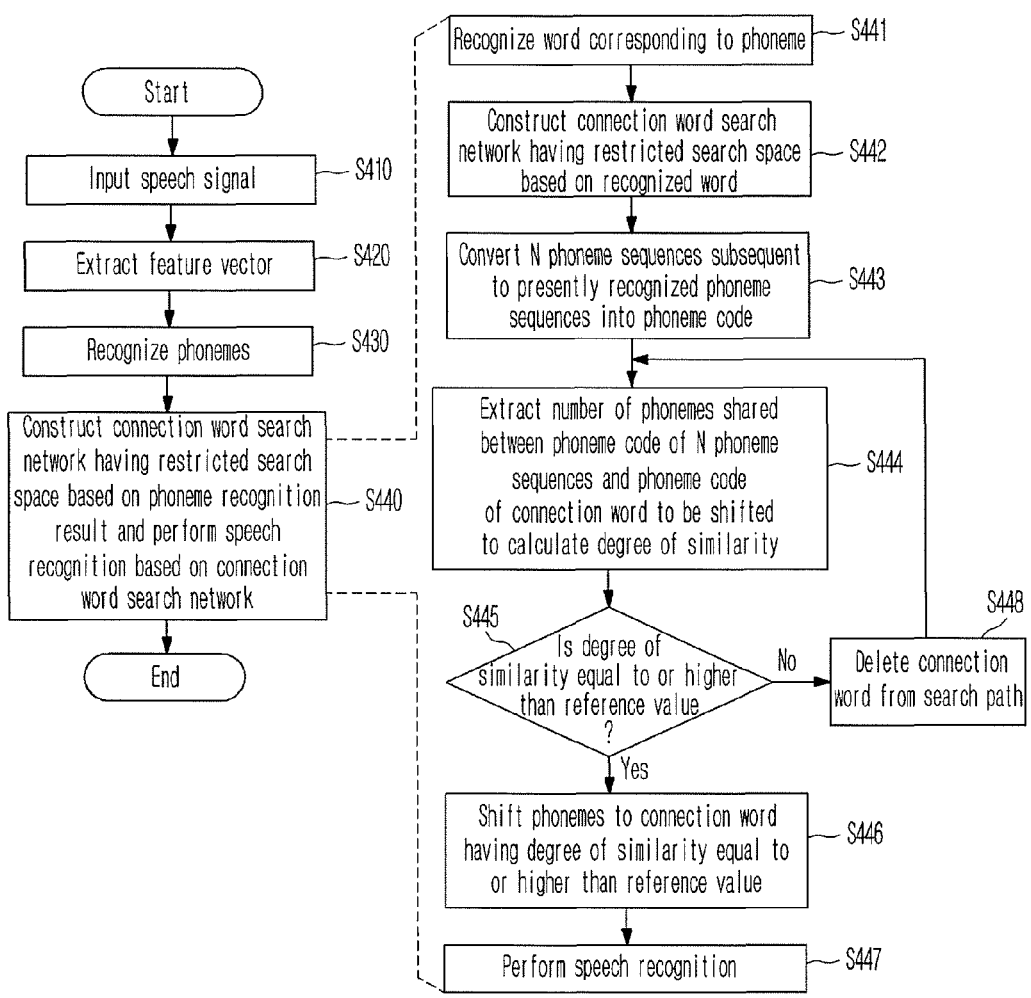
FIG. 4 is a flowchart illustrating a method of recognizing continuous speed using search space restriction based on phoneme recognition according to the present invention.

FIG. 4 is a flowchart illustrating a method of recognizing continuous speed using search space restriction based on phoneme recognition according to the present invention.

At the outset, when a speech signal is input in step 410, a feature vector is extracted from the input speech signal in step 420.

Next, phonemes are recognized based on the extracted feature vector in step 430. In this case, the recognition of the phonemes is performed using the phoneme search network 130, which includes phoneme n-gram.

Next, the connection word search network 160 having a restricted search space is constructed from a search network SN based on the phoneme recognition result and a speech recognition process is performed based on the connection word search network 160 in step 440. The speech recognition process will now be described in more detail.

Initially, each phoneme of the phoneme recognition result is received and a word corresponding to the received phoneme is recognized using the context dependent error model 170 and the pronouncing dictionary 180 in step 441. In this case, a word defined in the search network SN may be recognized if possible.

After that, the connection word search network 160 having a restricted search space is constructed based on the recognized word in step 442. For instance, as shown in FIG. 2, since there is a strong probability that a word subsequent to "Denver" 203A and "to" 204A will be a place name, the connection word search network 160 is constructed with place names such as "San Diego" 206, "Chicago" 207, "San Francisco" 208, and "Seattle" 209.

Subsequently, N phoneme sequences, which are subsequent to the presently recognized phoneme sequences, are converted into a phoneme code in step 443. Since the phoneme code has been described above in detail with reference to FIG. 3, it will not be described again here.

Next, in step 444, the number of phonemes shared between the phoneme code of the N phoneme sequences and the phoneme code of a connection word to be shifted to the connection word search network 160 is extracted to calculate the degree of similarity therebetween.

A method of calculating the degree of similarity will now be described in more detail. A logic AND operation is performed on the phoneme code of the N phoneme sequences and the phoneme code of the connection word to be shifted, and the sum of respective code values of the result of the AND operation is done to obtain the number of phonemes shared between the two phoneme codes. In this case, as the obtained number of shared phonemes is higher, it can be decided that the two phoneme codes are more similar. Therefore, the obtained number of shared phonemes can be used to calculate the degree of similarity.

Thereafter, it is confirmed if the degree of similarity is higher than a predetermined reference value in step 445. Thus, the phonemes to be recognized are shifted to the connection word having the degree of similarity equal to or higher than the predetermined reference value in step 446, and a speech recognition process is performed on the shifted word in step 447.

In this case, speech recognition errors, such as insertion errors, deletion errors, and transposition errors, may be corrected using as a acoustic model the DHMM-based context dependent error model 170.

However, the connection word having the degree of similarity lower than the predetermined reference value is deleted from a search path not to shift the phonemes to the connection word in step 448.

In other words, by restricting connection words to be shifted at the boundary between words (where phonemes are shifted to a word) using the phoneme recognition result, the search space is reduced to improve the speed and performance of the speech recognition.

As described above, in a conventional continuous speech recognition method, since word sequences having the highest probability is output as a speech recognition result based on feature data of speech in a search network constructed with all possible sentence patterns, the speed of speech recognition deteriorates. However, according to the present invention, a speech recognition process includes reducing a search space by restricting connection words to be shifted at a boundary between words based on a phoneme recognition result. As a result, the speed and performance of the speech recognition process can be enhanced.

According to the present invention, when speech recognition is performed, a search space is reduced by restricting connection words to be shifted at a boundary between words based on a phoneme recognition result. Therefore, the speed and performance of the speech recognition process can be enhanced.

In the drawings and specification, there have been disclosed typical preferred embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. An apparatus for recognizing continuous speech using search space restriction based on phoneme recognition, the apparatus comprising:

a speech feature extraction unit for extracting a feature vector from an input speech signal;

a phoneme recognition unit for recognizing phonemes based on the feature vector of the speech signal; and a phoneme-based speech recognition unit for recognizing a first word having corresponding first phoneme sequences from among the phonemes recognized by the phoneme recognition unit, and for constructing a connection word search network that includes connection words for the first word, wherein the phoneme-based speech recognition unit constructs the connection word search network to have a restricted search space based on the first word to perform a speech recognition process based on the connection word search network, wherein the phoneme-based speech recognition unit restricts connection words to be shifted at a boundary between words based on the first word to restrict a search space, and calculates a degree of similarity between the phoneme recognition result and the connection words to be shifted and shifts the phonemes to be recognized to a connection word having a degree of similarity equal to or higher than a predetermined reference value to restrict the search space, and wherein the phoneme-based speech recognition unit converts N phoneme sequences subsequent to the first phoneme sequences into a phoneme code, performs a logic AND operation on the phoneme code of the N phoneme sequences and the phoneme code of the connection word to be shifted, and does the sum of respective code values of the result of the AND operation to calculate the degree of similarity.

2. The apparatus according to claim 1, wherein the phoneme-based speech recognition unit deletes a connection word having a degree of similarity lower than the predetermined reference value from a search path.

3. The apparatus according to claim 1, wherein the degree of similarity is the number of phonemes shared between the phoneme code of the N phoneme sequences and the phoneme code of the connection word to be shifted.

4. The apparatus according to claim 1, further comprising a phoneme search network and a context independent acoustic model for recognizing the phonemes.

5. The apparatus according to claim 1, further comprising a context dependent error model and a pronouncing dictionary for recognizing speech.

6. The apparatus according to claim 5, wherein the phoneme-based speech recognition unit corrects insertion errors, deletion errors, or transposition errors using the context dependent error model.

7. The apparatus according to claim 5, wherein the pronouncing dictionary stores pronunciation sequences and phoneme codes of the corresponding words.

8. The apparatus according to claim 1, wherein in a state that a set of phonemes to be recognized are arranged in appropriate order, when a specific word includes a phoneme taken in the corresponding order, the corresponding phoneme code is set as "1", when the word does not include the phoneme, the corresponding phoneme code is set as "0", and when the word includes a phonetically changeable phoneme, the corresponding phoneme code is set as "1".

9. A method of recognizing continuous speech using search space restriction based on phoneme recognition, the method comprising the steps of:
    (a) extracting a feature vector from an input speech signal;
    (b) recognizing phonemes based on the extracted feature vector; and
    (c) recognizing a first word having corresponding first phoneme sequences from among the phonemes recognized in (b) and constructing a connection word search network that includes connection words form the first word, wherein the connection word search network has a search space that is restricted based on the first word, and performing a speech recognition process based on the connection word search network
    wherein step (c) comprises the steps of:
    (c-1) restricting a connection word to be shifted at a boundary between words based on the first word to restrict a search space; and
    (c-2) calculating a degree of similarity between the phoneme recognition result and the connection word to be shifted, and shifting the phonemes to be recognized to a connection word having a degree of similarity equal to or higher than a predetermined reference value to restrict the search space, wherein step (c-2) further comprises the steps of:
    converting N phoneme sequences subsequent to the first phoneme sequences into a phoneme code; and
    calculating the degree of similarity using the number of phonemes shared between the phoneme code of the N phoneme sequences and the phoneme code of the connection word to be shifted.

10. The method according to claim 9, wherein step (c-2) further comprises the step of deleting a connection word having a degree of similarity lower than the predetermined reference value from a search path.

11. The method according to claim 9, before step (a), further comprising the steps of: arranging a set of phonemes to be recognized in appropriate order and setting the corresponding phoneme code as "1" when a specific word includes a phoneme taken in the corresponding order, setting the corresponding phoneme code as "0" when the word does not include the phoneme, and setting the corresponding phoneme code as "1" when the word includes a phonetically changeable phoneme.

12. The method according to claim 9, wherein step (c) comprises the step of correcting insertion errors, deletion errors, or transposition errors using the context dependent error model.

13. A method of recognizing continuous speech using search space restriction based on phoneme recognition, the method comprising the steps of:
    (a) extracting a feature vector from an input speech signal;
    (b) recognizing phonemes based on the extracted feature vector; and
    (c) recognizing a first word having corresponding first phoneme sequences from among the phonemes recognized in (b) and constructing a connection word search network that includes connection words for the first word, wherein the connection word search network has a search space that is restricted based on the phoneme recognition result, and
    (d) converting, into a phoneme code, N phoneme sequences that are subsequent to the first phoneme sequences in the phonemes recognized in (b), and calculating degrees of similarity between the phoneme code of the converted N phoneme sequences and phoneme codes of the respective connection words of the restricted connection word search network.

14. The method according to claim 13, wherein calculating the degree of similarity comprises performing a logic AND operation on the phoneme code of the N phoneme sequences and the phoneme code of the connection word of the restricted connection word search network, and summing respective code values of the result of the AND operation to calculate the degree of similarity.

15. The apparatus according to claim 14, wherein the degree of similarity is the number of phonemes shared between the phoneme code of the N phoneme sequences and the phoneme code of the connection word of the restricted connection word search network.

* * * * *